United States Patent [19]

Collins

[11] Patent Number: 4,698,698

[45] Date of Patent: * Oct. 6, 1987

[54] DIGITAL TELEVISION SIGNAL PROCESSING APPARATUS

[75] Inventor: Mark C. Collins, Foxton, United Kingdom

[73] Assignee: Sony Corporation, Tokyo, Japan

[*] Notice: The portion of the term of this patent subsequent to Dec. 10, 2002 has been disclaimed.

[21] Appl. No.: 700,872

[22] Filed: Feb. 11, 1985

[30] Foreign Application Priority Data

Feb. 22, 1984 [GB] United Kingdom ............... 8404681

[51] Int. Cl.$^4$ .............................................. H04N 5/76
[52] U.S. Cl. ................................. 360/10.1; 360/10.3; 360/36.2; 358/312
[58] Field of Search ..................... 360/10.1, 10.3, 362; 358/140, 11, 312

[56] References Cited

U.S. PATENT DOCUMENTS 4,558,377 12/1985 Collins et al. ...................... 360/10.3

OTHER PUBLICATIONS

Computer Dictionary & Handbook; Sippl et al; ©1966, p. 314: "Memory Bank Select".

Primary Examiner—Aristotelis M. Psitos
Attorney, Agent, or Firm—Lewis H. Eslinger; Alvin Sinderbrand

[57] ABSTRACT

Digital televison signal processing apparatus comprise a field store arrangement comprising first, second and third field stores each capable of storing digital signals relating to one field of a televison signal, means to supply a digital television signal at a variable rate to the field store arrangement, a write control device to supply the digital television signal to at least one of the field stores for writing therein, depending on the rate of supply of the digital television signal, and a read control device to read the stored digital television signal from at least one of the field stores depending on the rate of supply of the television signal, no field store being written into at the same time that it is read from, and the write control device rotating the writing and reading around the field stores cyclically. Each of the field stores is formed by a plurality, for example four, of field store units and respective said field store units of each of the field stores are grouped together to receive the digital television signal via a common input.

11 Claims, 16 Drawing Figures

DIGITAL TELEVISION SIGNAL PROCESSING APPARATUS

BACKGROUND OF THE INVENTION

1. Field of the Invention

This invention relates to digital television signal processing apparatus and more particularly, but not exclusively, to digital television signal processing apparatus for use with digital video tape recorders (DVTRs).

2. Description of the Prior Art

In a DVTR, an incoming television signal to be recorded is sampled, the samples are pulse code modulation coded into digital form, and the resulting digital data signals are recorded on a magnetic tape and subsequently reproduced. The reproduced digital data signals are decoded, and the decoded signals are used to form an analog signal corresponding to the original television signal.

If errors occur in the handling of the digital signals, for example due to noise or tape drop-out occuring in the DVTR, the digital signals are corrupted and then the reformed analog television signal does not correspond exactly to the original analog television signal, and the resulting television picture is degraded.

There are two main approaches to dealing with errors in digital television signals. The first approach is correction, which involves the production and use of additional data signals purely for the purposes of error detection and correction, these additional data signals otherwise being redundant. While correction provides good results, in cannot generally by used as the sole means of dealing with errors, because a comprehensive correction capability would require an excessive amount of additional data which might overload the data handling parts or raise the data rate to an unacceptable level. The second approach is concealment. This comprises the replacement of corrupted data signals by data signals generated using available uncorrupted data signals. This method relies largely for accuracy on the strong correlation that exists in the television signal.

When a DVTR is reproducing in the normal reproducing mode, that is at the normal replay speed, the data is being recovered from the tape at the same overall rate that it is required for display on television receiver. It is only necessary to provide time-base correction to synchronize the data reproduced from the tape with stable output synchronizing signals.

However, reproduction at non-normal speeds is now commonly required. Such reproduction is referred to generally as special reproduction modes and these include still, slow motion, reverse motion and the so-called shuttle mode which comprises the whole range of speeds from fast-forward to fast-reverse and which is of particular utility in searching, for example while editing. In the special reproduction modes the tape transport speed may be changed very substantially while the head drum of the DVTR is generally rotated at the same speed or at least at approximately the same speed as that used for the normal reproduction mode. The range of speeds is so great that even if dynamic tracking is used there is inevitably some mistracking, at least at some speeds in some special reproduction modes, but as much data as possible is recovered. The problems involved in handling this reproduced data, relating as it does to parts of fields and containing noise and errors, as well as needing possibly very substantial time-base correction, is taken up in our co-pending UK patent application No. 8113802 (Ser. No. 2,098,031, EP-A-0065365) which corresponds to U.S. Pat. No. 4,558,377.

The above application provides a field store arrangement formed by three field stores each of which is capable of storing digital signals relating to one field of a television signal. A digital television signal reproduced at a variable rate from a DVTR is supplied to one or to two of the field stores for writing therein, depending on the rate of supply of the digital television signal. The stored digital television signal is read from one or two of the field stores, again depending on the rate of supply of the television signal, no field store being written into at the same time that it is being read from, and the writing and reading being rotated around the three field stores cyclically.

This prior arrangement has been found to operate well, the reproduced pictures obtained in the slow motion mode being particularly good and the reproduced pictures obtained in other special reproduction modes being acceptable. However, there are still some residual problems. In particular, the arrangement is somewhat complex, and in part this is due to the fact that there is significant circuit duplication, for example in that error correction is provided for each field store and there are respective read address generators. Moreover, different synchronizing signals are used in recording and reproduction and this makes insert editing very difficult. Also there is a tendency for the reproduced picture to "break-up" at the transition between different tape speeds, and patterned effects may occur at certain tape speeds depending on the shuffling system used.

SUMMARY OF THE INVENTION

One object of the present invention is to provide a digital television signal processing apparatus in which these problems can largely be overcome.

Another object of the present invention is to provide a digital television signal processing apparatus comprising field stores and in which each field store is formed of a plurality of field store units.

Another object of the present invention is to provide a digital television signal processing apparatus comprising field stores and in which each field store is formed of a plurality of field store units, and respective field store units in each field store are grouped together to receive a digital television signal via a common input.

According to the present invention there is provided digital television signal processing apparatus comprising:

a field store arrangement comprising first, second and third field stores each capable of storing digital signals relating to one field of a television signal;

means to supply a digital television signal at a variable rate to said field store arrangement;

means to supply said digital television signal to at least one of said field stores for writing therein, depending on said rate of supply of said digital television signal;

means to read said stored digital television signal from at least one of said field stores, depending on said rate of supply of said digital television signal, no said field store being written into at the same time that it is read from; and means to rotate said writing and reading around said field stores cyclically; each of said field stores being formed of a plurality of field store units and respective said field store units of each of said field stores being grouped together to receive said digital television signal via a common input.

For example, in one embodiment of the invention each of the field stores is formed in four distinct units or parts, to which reproduced signals from four reproducing heads of a DVTR are supplied. It is preferred that error correction and concealment be handled outside the field store arrangement, while time-base correction and data deshuffling are effected within the field store arrangement.

The above, and other objects, features and advantageous of this invention will be apparent from the following detailed description of illustrative embodiments which is to be read in connection with the accompanying drawings.

DESCRIPTION OF THE PREFERRED EMBODIMENTS

The general form of operation of a digital television signal processing apparatus according to the present invention will first be described with reference to FIGS. 1 to 5.

Figure 1:
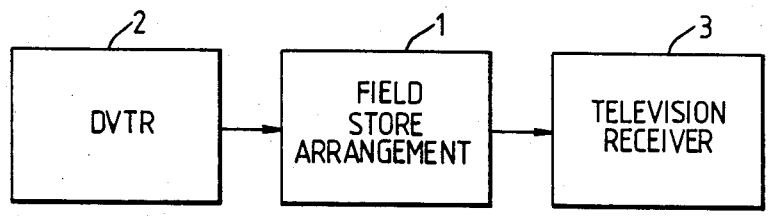
FIG. 1 is a very much simplified block diagram used to explain the general operation of embodiments of digital television signal processing apparatus according to the invention.

Referring to FIG. 1, the central part of the digital television signal processing apparatus to be described is a field store arrangement 1 which forms a buffer store between a DVTR 2 and a television receiver 3 on which a television picture derived from a television signal reproduced from the DVTR 2 is to be displayed. The DVTR 2 has a normal reproduction mode corresponding to normal motion reproduction and special reproduction modes corresponding to slow (which includes still) motion and fast (which includes shuttle) motion. In the normal reproduction mode, the data is being recovered from the magnetic tape in the DVTR 2 at the same overall rate; that is at the same rate apart only from time-base fluctuations, as required for display on the television picture.

Figure 2:
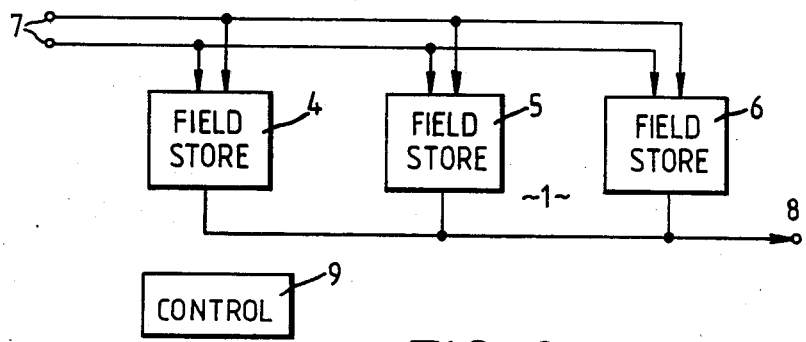
FIG. 2 is a block diagram showing in more detail a field store arrangement forming part of the apparatus of FIG. 1.

Referring to FIG. 2, this shows the field store arrangement 1 in slightly more detail. The field store arrangement 1 comprises three field stores 4, 5 and 6, having common inputs 7 connected to the DVTR 2 (FIG. 1) and a common output 8. The field store arrangement 1 operates under the general control of a control device 9, and as will be described below the operation is basically the same whichever mode the DVTR 2 is in.

The field stores 4, 5 and 6 are identical and each is capable of storing digital signals relating to one field of a television signal. For PAL systems using the standard sampling rate of 13.5 megasamples per second, assuming 300 active lines per field, 1440 active samples per line, and each sample pulse code modulation coded to form an 8-bit word plus three error flag bits referred to below, this means that each field store 4, 5 and 6 must be capable of storing at least 4.7 million bits.

Before considering the operation in detail in must be realised that it is not possible to display more data than is satisfactorily recovered at high speeds, and that at low speeds it must be possible to use data repeatedly. At non-normal tape speeds the off-tape data format and the data sequence may be widely different from normal, and this of itself dictates the need for some form of buffer storage to assemble the data and to ensure the conceptual view that is expected. What this latter means is that on display on the television receiver 3 (FIG. 1) of certain actions, such as a person walking, the viewer has a mental conception of what the action should look like and although on reproduction the action may be speeded up or slowed down, the action should still conform to the viewer's conception of it.

In the field store arrangement 1, the control device 9 will continue to read from one field store 4, 5 or 6 until all the data in that field store 4, 5 or 6 has been read and only then will it switch to another field store. The use of three field stores 4, 5 and 6 makes it unnecessary to write into and read from the same field store at the same time, despite different reproduction speeds and time-base errors of the reproduced data. Moreover, the use of the three field stores 4, 5 and 6 avoids clashes between requirements to write into and read from the same field store, produces pictures which are conceptually better, and saves a considerable amount of hardware elsewhere in the reproduction system.

The writing and reading operations associated with the field store arrangement 1 will now be further described with reference to FIGS. 3 to 5.

Figure 3A:
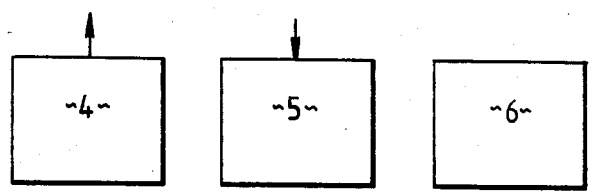
FIGS. 3A and 3B illustrate diagrammatically the operation of the field store arrangement of FIG. 2 in a normal reproduction mode.
Figure 3B:
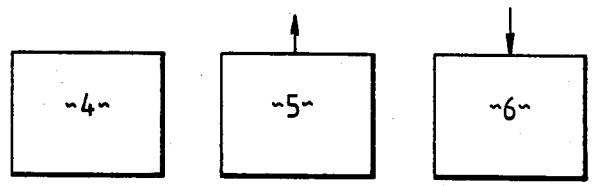

The normal reproduction mode will be described first. As indicated in FIG. 3A, data is first read from the field store 4 while being written into the field store 5. When all the data has been read from the field store 4, data is read from the field store 5 while being written into the field store 6, as indicated in FIG. 3B. Reading and writing continue to rotate around the field stores 4, 5 and 6 cyclically in this way.

Figure 4A:
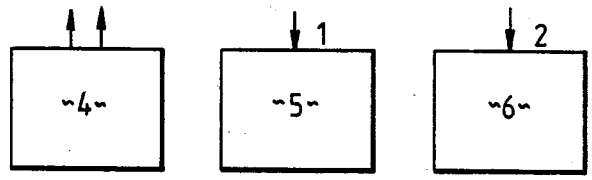
FIGS. 4A and 4B illustrate diagrammatically the operation of the field store arrangement of FIG. 2 in a slow motion reproduction mode.
Figure 4B:
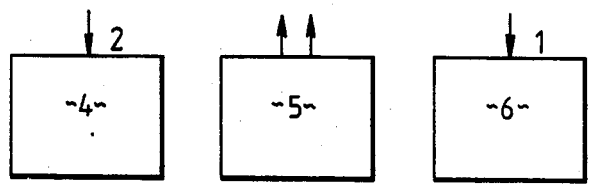

The slow motion reproduction mode will be described next. This covers speeds from zero to plus or minus the normal reproduction speed. As indicated in FIG. 4A, data is read from the field store 4 repeatedly while data is being written into the field store 5. When the field store 5 is full, writing continues in the field store 6. Then, when reading of a field from the field store 4 is next completed, reading moves to the field store 5, as indicated in FIG. 4B. This makes the field store 4 available to be written in as soon as the field store 6 is full. Reading and writing continue to rotate around the field stores 4, 5 and 6 cyclically in this way.

Figure 5A:
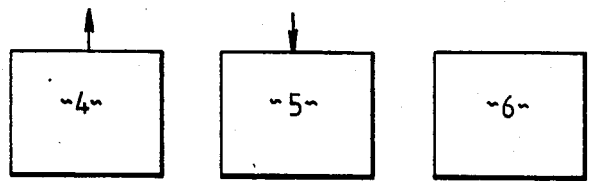
FIGS. 5A and 5B illustrate diagrammatically the operation of the field store arrangement of FIG. 2 in a fast motion reproduction mode.
Figure 5B:
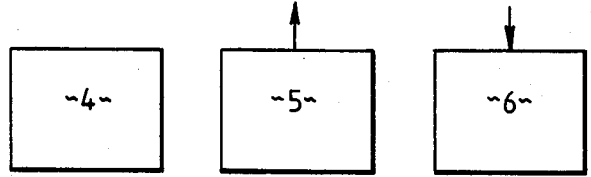

Finally, the fast motion reproduction mode will be described. As indicated in FIG. 5A, data is read from the field store 4, while being written into the field store 5. When a complete field has been read, the reading switches to the field store 5, while the field store 6 is written into, as indicated in FIG. 5B. Reading and writing continue to rotate around the field stores 4, 5 and 6 cyclically in this way.

It will be seen that although described as three distinct reproduction modes so far as the DVTR 2 is concerned, they are in fact basically the same so far as the field store arrangement 1 is concerned, and moreover the operation of the field store arrangement 1 can change smoothly from one to another as the reproduction speed changes. In all three of these modes the writing of data into the field store arrangement 1 will be totally asynchronous with the reading out of the data, and this facilitates time-base correction.

The embodiment of television signal processing apparatus will now be described in more detail with refence to FIGS. 6 to 11.

Figure 7:
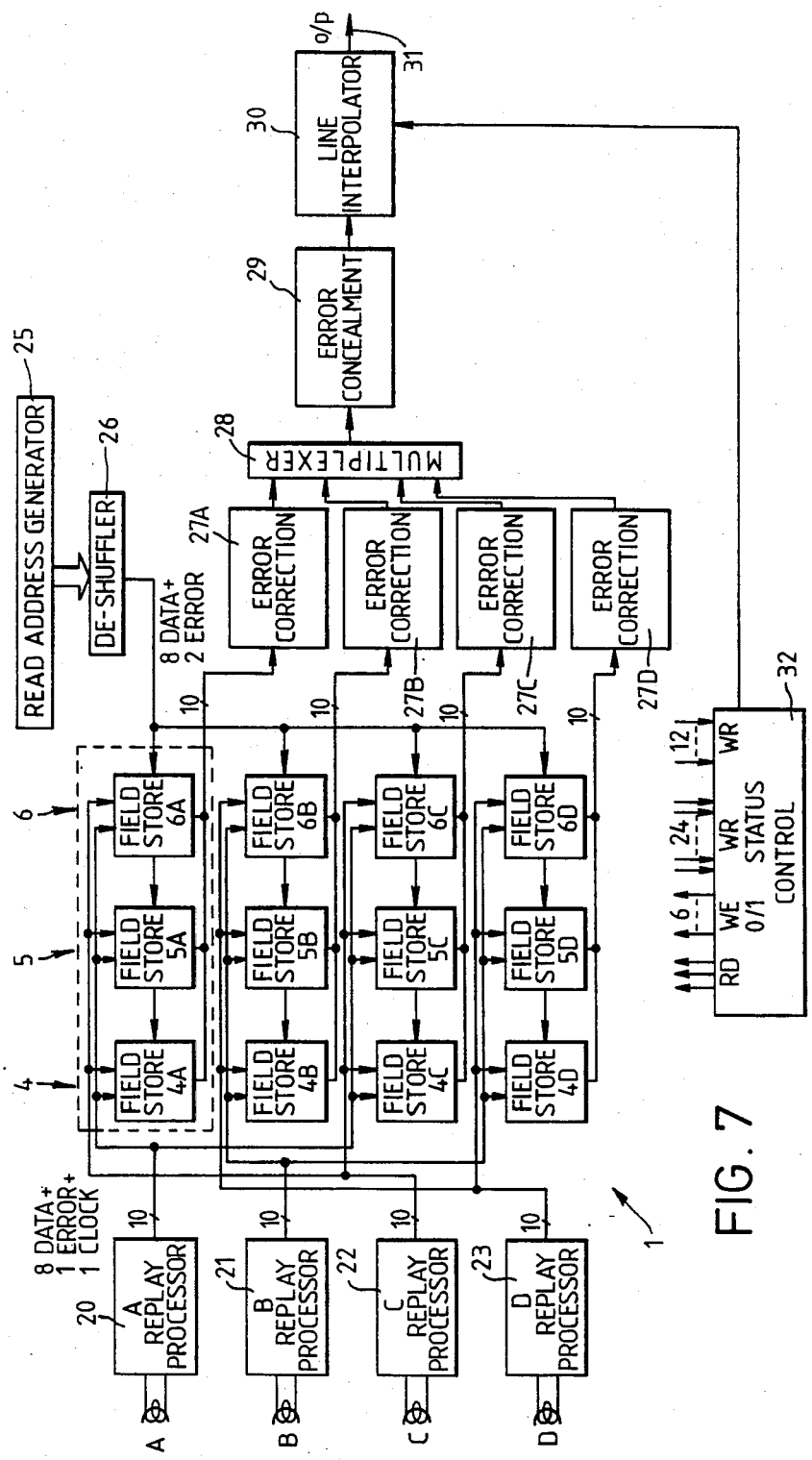
FIG. 7 is a block diagram showing in more detail an embodiment of television signal processing apparatus according to the present invention and including a field store arrangement.

Referring first to FIG. 7, the embodiment is for use with the DVTR 2 having two pairs of recording/reproducing heads A and B, and C and D, disposed at an angular spacing of 180°. The heads A and C have the same azimuth gaps and so do the heads B and D, but the azimuth of the heads A and C is different from that of the heads B and D. The wrap angle of the magnetic tape is in excess of 180°, and this necessitates using four channels for the data. These figures are only given by way of example. Thus it will be seen from FIG. 7 that if the wrap angle were decreased below 180° then the DVTR 2 could operate with just two channels. Likewise a three channel device could be operated with six channels if the wrap angle were greater than 180°.

Figure 6:
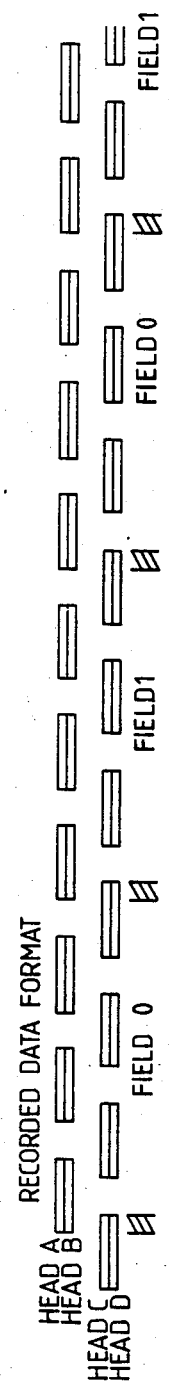
FIG. 6 shows diagrammatically a recorded data format.

The drum of the DVTR 2 is rotated at 150 revolutions per second, and the resulting recorded data format is indicated diagrammatically in FIG. 6. The forman shown is for a 625-line system with six segments shown for each field. For a 525-line system, there would be five segments for each field. Because of the four channel arrangement each of the field stores 4, 5 and 6 in the field store arrangement 1 of the embodiment is divided into four field store units 4A, 4B, 4C and 4D, 5A, 5B, 5C and 5D, and 6A, 6B, 6C and 6D. Each field store unit comprises random access memories (RAMs) and requires 128k×11 bits.

Data reproduced by the recording/reproducing head A passes by way of an A replay processor 20 which effects address recovery and generation, clock regeneration and also preliminary error detection and error correction, and supplies data words comprising eight data bits plus one error flag bit and a clock pulse signal to the field store units 4A, 5A, 6A, 4C, 5C and 6C where the data and error flags are selectively written under control of write control signals referred to below. Likewise, a B replay processor 21 supplies data words and an error flag bit to the field store units 4B, 5B, 6B, 4D, 5D and 6D, a C replay processor 22 supplies data words and an error flag bit to the field store units 4A, 5A, 6A, 4C, 5C and 6C, and a D replay processor 23 supplies data words and an error flag bit to the field store units 4B, 5B, 6B, 4D, 5D and 6D. A read address generator 25 supplies read addresses by way of a deshuffler 25 to each of the field stores 4, 5 and 6. The deshuffler 26 is a programmable read-only memory programmed to effect deshuffling of the data words to reverse the shuffling effected prior to recording. Such shuffling and deshuffling is normally used because burst errors tend to be more common than individual errors, and because concealment techniques generally rely for their effectiveness in correcting data words which are in error on there being adjacent words Which are not in error, so a burst error effecting a sequence of data words along a scan line can be difficult to conceal. However, by shuffling and deshuffling the natural order of the data words, the error data words resulting from a burst error can be distributed over a whole scan line or even a whole segment of scan lines or a whole field, so that they are each more likely to be surrounded by correct data words.

Each of the field stores 4, 5 and 6 supplies output 8-bit data words each with two associated error flag bits under control of read signals (to be described later) to a respective error correction device 27A, 27B, 27C or 27D, the outputs of which are connected by way of a multiplexer 28 to an error concealment device 29, and thence by way of a line interpolation device 30 to an output 31. A control device 32 receives and supplies control signals as indicated diagrammatically and as described in more detail below.

The error correction devices 27A, 27B, 27C and 27D effect error correction of the data words in a known manner making use of the error correction flags associated with the data words. It is preferable for this error correction to be performed prior to multiplexing of the data words in the four channels as otherwise loss of a single channel due, for examle, to drop-out may prevent error correction in any of the channels.

Figure 8:
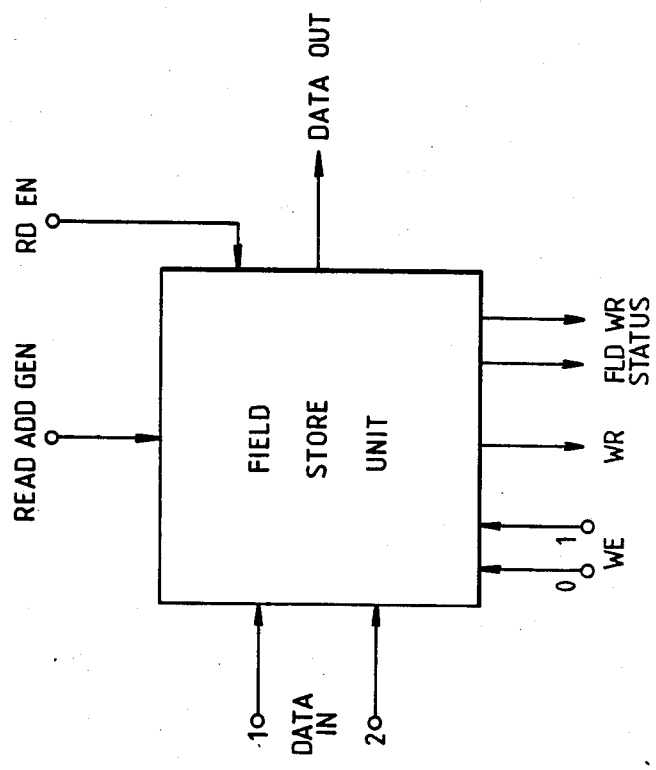
FIG. 8 is a block diagram of a field store unit forming part of a field store arrangement in the embodiment of FIG. 7.
Figures 9, 10:
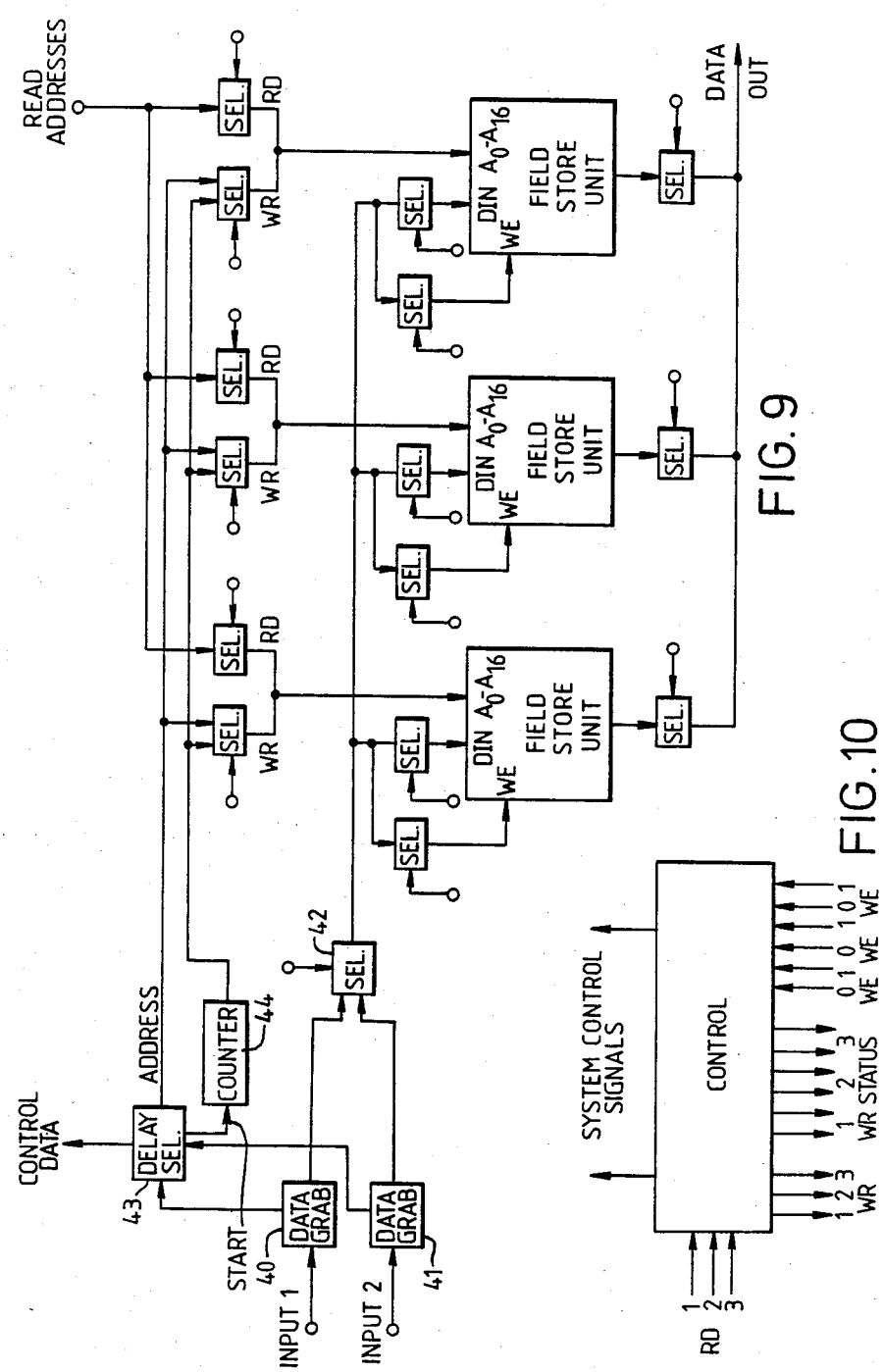
FIG. 9 is a block diagram showing parts of the field store arrangement of FIG. 7 in more detail.
FIG. 10 is a block diagram for explaining control of the field store arrangement of FIG. 7.

FIG. 8 shows in more detail the input and output data and control signals for a single field store unit, while FIG. 9 shows in more detail the arrangement of a group of three field store units, such as the field store units 4A, 5A and 6A indicated by a broken line in FIG. 7. FIG. 10 shows the signals associated with the field store unit control device 32.

As shown in FIG. 9, with each group of three field store units there are associated selector circuits (SEL) which are controlled by the signals from the field store unit control device 32 to effect the required reading and writing operations. At the data input, data grab circuits 40 and 41 receiving data (and error flags and clock pulses) from the respective replay processors 20 to 23 (FIG. 7) supply the data words by way of a selector circuit 42 to the three field store units, and also to a delay plus selector circut 43 which derives control data and also addresses based on the field, segment, line and block number of the incoming data. The delay plus selector circuit 42 also supplies a start pulse to a counter 44 for timing purposes.

The embodiment has three operational modes, these being:

(1) end to end (E to E which is used when an input video signals to the DVTR 2 is passed directly to the output of the DVTR 2), play (normal reproduction) and confidence replay (2) slow motion (3) shuttle The operation of the field store arrangement 1 is fundamentally the same for each of these three operational modes and the off-tape data alone is used to indicate the operational mode, so that no external processing or control is required.

The control signals associated with each field store unit and indicated in FIG. 8 will now be described in more detail. All the signals are active when low.

RD.EN.

This signal selects the read addresses and enables data to be read out onto the output bus. The total number of RD.EN signals required is three, one for each of the field stores 4, 5 and 6.

WE0 and WE1.

These pairs of signals enable data to be written into a field store 4, 5 or 6 from a field 0 or field 1 respectively. Three pairs of these signals WE0 and WE1 are required, one pair for each field store 4, 5 and 6.

WR.

This signal is an output from each field store unit and indicates when data is being written into the field store unit. There are therefore a total of twelve signals WR.

FLD WR STATUS.

This is a pair of signals to indicate the status of the write process. In this embodiment these signals are coded as follows:

00 - Field 0 Written
01 - Field 1 Written
10 - Nothing Written
11 - Mixture of more than one field Written A total of twelve pairs of the signals FLD WR STATUS are required, one pair for each field store unit.

Figure 11A:
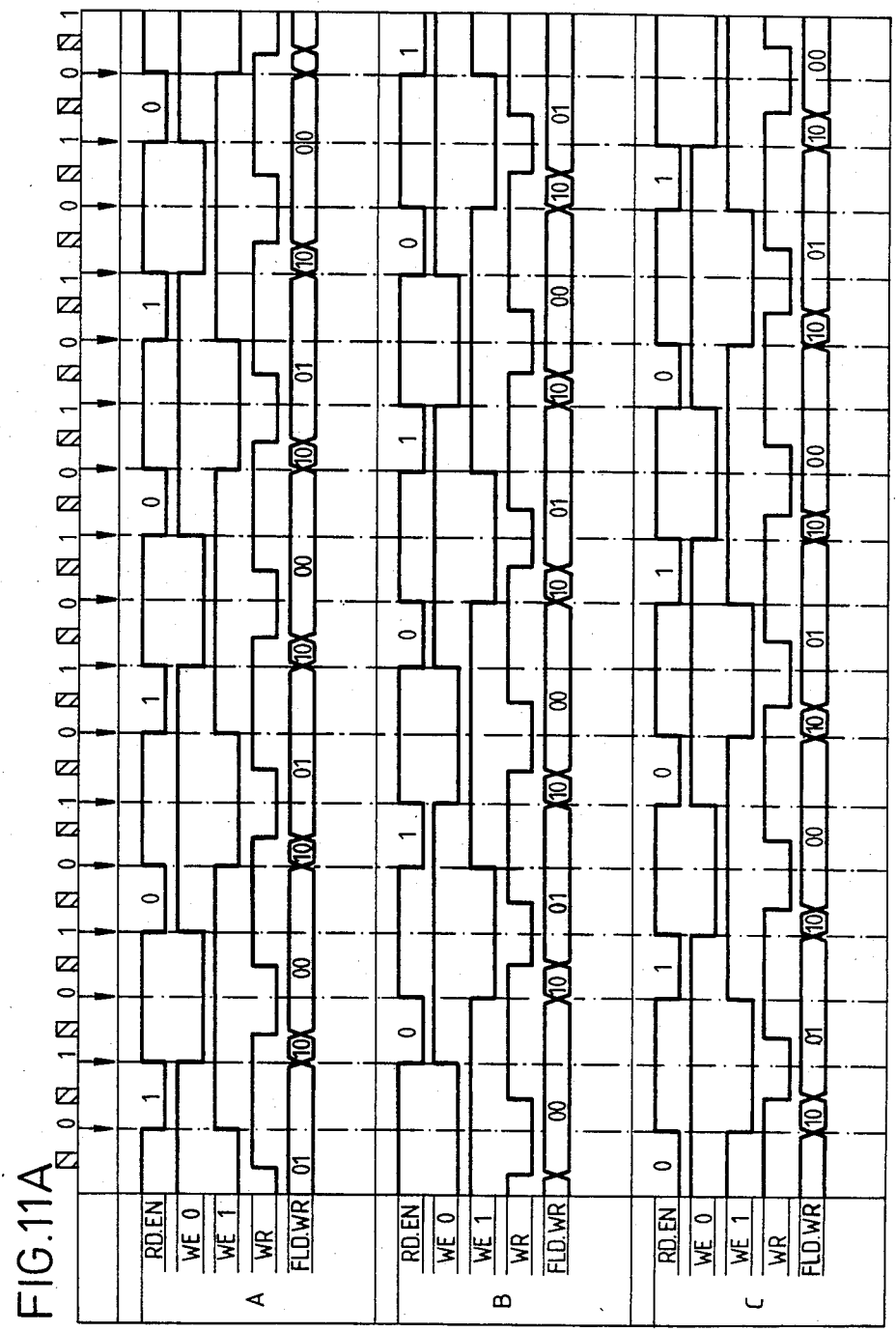
FIGS. 11A, 11B and 11C show waveforms for describing operation of the field store arrangement of FIG. 7 in respective different reproduction modes.
Figure 11B:
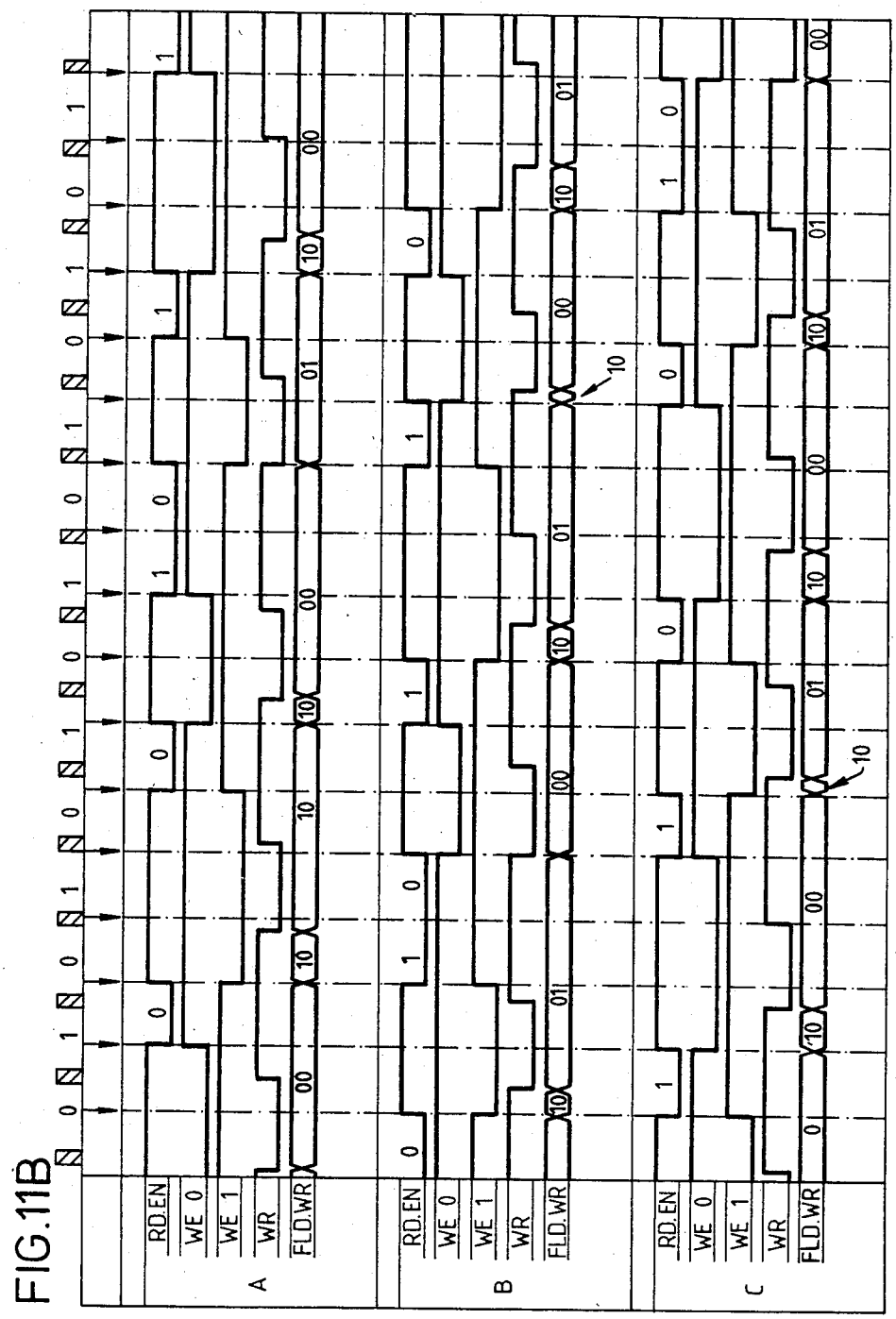
Figure 11C:
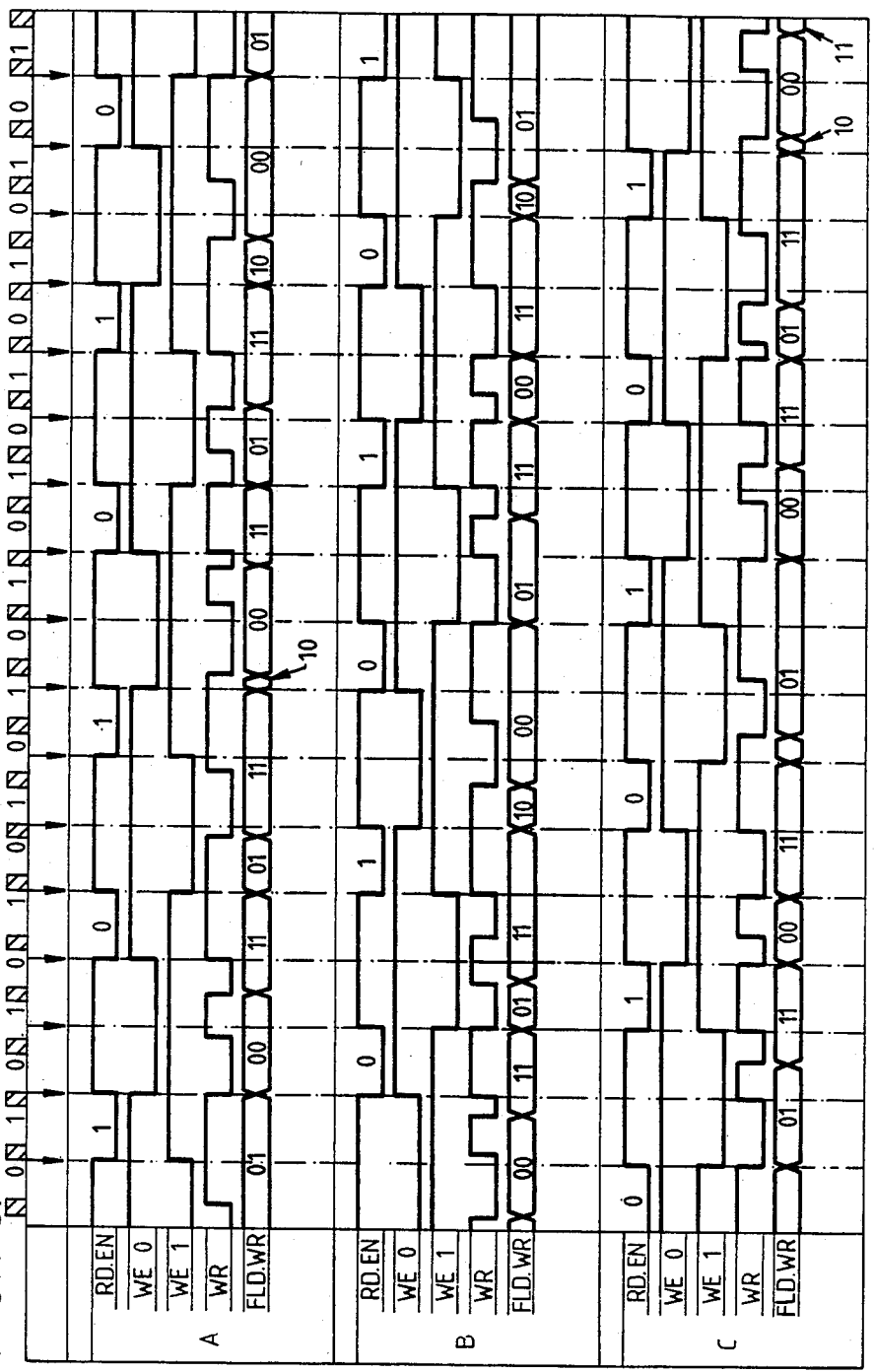

FIGS. 11A, 11B and 11C show the relationships between these control signals for each of the three operational modes. FIG. 11A corresponds to the E to E, play and confidence replay operational mode, FIG. 11B to the slow motion operational mode, and FIG. 11C to the shuttle operational mode.

The operation will now be described in more detail with reference to rules which govern the signals. Writing and reading of each field store 4, 5 and 6 cycles continuously with the read following as closely as possible behind the write. The rate at which the read process cycles is determined by the write, that is to say by the off-tape data. The principal rules are as follows:

(1) The read and write process for each field store 4, 5 and 6 is totally separate in time.

(2) The read follows immediately the write is completed in the next field interval.

(3) The read advances only in the vertical interval.

(4) The control signal WE is used to enable data to be written from one particular field only, that is to say either odd or even. The control signals WE0 and WE1 are mutually exclusive, so that only one field polarity is written into each field store 4, 5 and 6.

(5) The control signal WR indicates when any data is being written into that field store unit.

(6) The pair of control signals FLD WR STATUS (FWS) indicate the write status of each field and are reset to the "no data written" state when the field read is completed. When data is written from a field of a particular polarity an FWS signal immediately indicates the appropriate code. It is possible, however, that within the period in which the control signal WE is active, data may be written from the next field of the same polarity. Under these circumstances the signal FWS immediately indicates that data is written from a mixture of fields. This necessitates a minimum field labelling sequence of four fields. (7) To indicate reasonably fully the selection of possible error conditions that each data word can assume, an array of error flags are required. These error flags comprise data valid flags generated by the replay processors 20 to 23, and field valid flags and data read flags generated in the field store arrangement 1. Each of these will now be considered.

The data valid flag is used to indicate the presence of valid data. In this context valid data is defined as error-free data recovered in the last write process to a particular field store and not before. Only valid data is written into the field stores 4, 5 and 6.

The field valid flag is used to indicate the validity of the data in terms of its field sequence. When data is first written it is assumed to be from one field alone. As the write process continues, data may be written from the next field of the same polarity, that is to say from the corresponding field one frame later. All such data and any subsequent data, will have this flag set to indicate that it does not correspond with the previous data and cannot therefore be used for error correction purposes with that earlier data.

Both the data valid flag and the field valid flag are required by the circuitry subsequent to the field store arrangement 1 and are therefore supplied together with the data words to the error correcting circuits 27A, 27B, 27C and 27D.

The third error flag, that is the data read flag is not required by the subsequent circuitry and is merely used to show when data has been read from the field store 4, 5 or 6, thereby enabling the system to distinguish between new and old data. The data read flag is set by the read process and reset by any data being written into each location. This means that when data write is completed, any data locations that still have this flag set are from previous write/read operations. The first time this data is read, the data read flag is set, and the data valid flag is reset if the data read flag is already set.

(8) When the control signal FWS is cleared, it is used to determine the next state for the pair of control signals WE0 and WE1 for that field. If the control signal FWS indicates a field 0 write then the control signal WE1 will be activated in the next write phase. The converse is true for a field 1 write. If a mixed write is indicated, then the control signal WE goes to the inverse of the field read.

(9) The control signal WE is enabled for the total time between successive read processes of the same field store unit.

It is not essential that each field store is formed into four field store units, as some other number may be appropriate to other data recording formats or recording/reproducing head arrangements. Also, although described for azimuth recording, the apparatus an be adapted to non-azimuth recording, in which case each of the replay processors 20 to 23 is arranged to supply data to any one of the field store units 4A to 6D.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Digital television signal processing apparatus comprising:

a field store arrangement comprising first, second and third field stores each capable of storing digital signals relating to one field of a television signal;

means to supply a digital television signal at a variable rate to said field store arrangement;

means to supply said digital television signal to at least one of said field stores for writing therein, depending on said rate of supply of said digital television signal;

means to read said stored digital television signal from at least one of said field stores, depending on said rate of supply of said digital television signal, no said field store being written into at the same time that it is read from; and means to rotate said writing and reading around said field stores cyclically; each of said field stores being formed of a plurality of field store units and respective said field store units of each of said field stores being grouped together to receive said digital television signal via a common input.

2. Apparatus according to claim 1 wherein each of said field stores is formed by four field store units.

3. Apparatus according to claim 1 wherein a single read address generator generates read address signals for all said field stores.

4. Apparatus according to claim 1 wherein said means to supply said digital television signal is a digital video tape recorder having a normal reproduction mode corresponding to normal motion reproduction of a recorded digital television signal and special reproduction modes corresponding to slow motion and fast motion reproduction of a recorded digital television signal, and wherein said stored digital television signal is read from said field store arrangement at a rate suitable for reproduction on a television reciever.

5. Apparatus according to claim 4 wherein in said normal reproduction mode of said video tape recorder said digital television signal is read from said first field store while being written into said second field store, and is then read from said second field store while being written into said third field store, this sequence continuing cyclically.

6. Apparatus according to claim 4 wherein in slow motion reproduction modes of said video tape recorder said digital television signal is repeatedly read from said first field store while being written into said second field store and then into said third field store, and is then repeatedly read from said second field store while being written into said third field store and then into said first field store, this sequence continuing cyclically.

7. Apparatus according to claim 4 wherein in fast motion reproduction modes of said video tape recorder said digital television signals is read from said first field store while being written into said second field store, and is then read from said second field store while being written into said third field store, this sequence continuing cyclically.

8. Apparatus according to claim 1 wherein an error correction device is provided subsequent and responsive to said field store arrangement to effect error correction of data words of said digital television signal read from said field store arrangement.

9. Apparatus according to claim 8 wherein an error concealment device is provided subsequent and responsive to said error correction device, to effect concealment of error data words which are not correctable by said error correction device.

10. Apparatus according to claim 1 wherein deshuffling is effected on read out from said field store arrangement.

11. Apparatus according to claim 1 wherein time-base correction is effected on read out from said field store arrangement.

* * * * *